United States Patent
Eckert et al.

(10) Patent No.: US 11,588,960 B2
(45) Date of Patent: Feb. 21, 2023

(54) CAMERA DEVICE AND METHOD FOR ASSEMBLING A CAMERA DEVICE

(71) Applicant: Robert Bosch GmbH, Stuttgart (DE)

(72) Inventors: Daniel Eckert, Markgroeningen (DE); Joachim Breidert, Schwieberdingen (DE); Joao Fernando Nujo Carrascoza, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/644,401

(22) Filed: Dec. 15, 2021

(65) Prior Publication Data

US 2022/0201170 A1    Jun. 23, 2022

(30) Foreign Application Priority Data

Dec. 23, 2020    (DE) ............... 10 2020 216 531.9

(51) Int. Cl.
*H04N 5/225* (2006.01)
*G02B 27/00* (2006.01)

(52) U.S. Cl.
CPC ....... *H04N 5/2254* (2013.01); *G02B 27/0006* (2013.01); *H04N 5/2252* (2013.01)

(58) Field of Classification Search
CPC ............ G02B 27/0006; H04N 5/2252; H04N 5/22521; H04N 5/2254
See application file for complete search history.

(56) References Cited

U.S. PATENT DOCUMENTS

| | | | |
|---|---|---|---|
| 2015/0229843 A1* | 8/2015 | Shimizu | H04N 5/23258 348/222.1 |
| 2017/0094257 A1* | 3/2017 | Zhang | H04N 13/30 |
| 2018/0143298 A1* | 5/2018 | Newman | G01C 21/3484 |
| 2018/0176431 A1* | 6/2018 | Kim | H05B 3/84 |
| 2019/0089872 A1* | 3/2019 | Rukes | G08B 13/19626 |
| 2021/0392256 A1* | 12/2021 | Lee | G03B 17/55 |
| 2022/0035079 A1* | 2/2022 | Karam | H04N 5/2254 |

FOREIGN PATENT DOCUMENTS

| | | |
|---|---|---|
| DE | 102018214108 A1 | 2/2020 |
| DE | 102019200061 A1 | 7/2020 |
| DE | 102019203378 A1 | 9/2020 |

* cited by examiner

*Primary Examiner* — Amy R Hsu
(74) *Attorney, Agent, or Firm* — Norton Rose Fulbright US LLP; Gerard Messina

(57) ABSTRACT

A method for assembling a camera device. The camera device has a first camera module including at least one objective device having an optical axis; an electrical heating element; and an electrically conductive contact region; a second camera module which is connectable to the first camera module and has an electrical energy supply for the heating element; and a deflectable connection element for the electrical contacting of the heating element via the contact region, the contacting being a function of an actuation position of an actuating element which is able to be mechanically coupled with the connection element and a connection between the first and the second camera module is established in that the first camera module and the second camera module are mutually fixed in position while the connection element is in a first deflection position.

10 Claims, 3 Drawing Sheets

CAMERA DEVICE AND METHOD FOR ASSEMBLING A CAMERA DEVICE

CROSS REFERENCE

The present application claims the benefit under 35 U.S.C. § 119 of German Patent Application No. DE 102020216531.9 filed on Dec. 23, 2020, which is expressly incorporated herein by reference in its entirety.

FIELD

The present invention relates to a method for assembling a camera device. In addition, the present invention relates to a camera device.

BACKGROUND INFORMATION

German Patent Application No. DE 10 2019 200 061 A1 describes a camera device which has an objective device including a lens and a lens holder which accommodates the lens. The lens holder is connected via a holder to a sensor carrier, which has an image sensor. The lens holder is fastened to the holder, and the holder is fastened to the sensor carrier via a bonded connection in each case. Such a bonded connection makes it possible to compensate for deviations between the objective device and the image sensor. For instance, the objective device and the image sensor can be aligned with each other prior to an attachment and then be firmly connected to each other via the bonded connection.

It is furthermore conventional to heat the objective device via a heating element for use of the camera device at low temperatures, for instance. German Patent Application No. DE 10 2019 203 378 A1 describes a lens housing in which a heating element is situated. This makes it possible to operate the lens free of ice or condensed water, for instance. U.S. Patent Application Publication No. U.S. Pat. No. 2,018,176 431 A1 describes a camera device in which the lens housing has a heating element, which is electrically connected via elastic connection elements to a circuit board provided with an image sensor.

SUMMARY

According to the present invention, a method is provided for assembling a camera device. Example embodiments of the present invention make it possible to construct the camera device more easily and rapidly. The alignment and connection of the first to the second camera module are able to be carried out more independently of the electrical contacting between the connection element and the contact region. Conversely, the electrical contacting may also be implemented more independently of the position and alignment of the first camera module relative to the second camera module.

In accordance with an example embodiment of the present invention, to increase the detection quality of the image sensor, the first camera module including the objective device and the second camera module having the image sensor are preferably mutually aligned before being fastened to each other. The position and the alignment are established especially during the assembly and may be independent of deviations of the components to be aligned. The precise alignment and stable connection between the objective device and the image sensor thus are decoupled from the forces of the connection element acting on the interface between the first and second camera module for the electrical contacting of the heating element. The accuracy and joining quality during the assembly of the first and second camera module is improved.

The camera device may be situated in a vehicle. The camera device is able to supply input data for a driver assistance system. The camera device may be situated in a tool, a consumer good, preferably a durable consumer item, or in an industrial production, monitoring and/or control system.

In accordance with an example embodiment of the present invention, the second camera module can have a housing and/or a circuit board. The circuit board may include an image sensor, in particular a CCD sensor or CMOS sensor. The electrical energy supply for the heating element may be assigned to the circuit board.

The first and second camera modules may be interconnected by form locking, friction locking and/or in an integral fashion, in particular before the movement of the actuating element to the second actuation position occurs. The first and second camera modules are preferably connected to each other with the aid of a bonded connection. The movement of the actuating element to the second actuation position preferably takes place after the bonded connection has cured. This makes it possible to reduce the forces on the bonded connection during the curing. If the first camera module is firmly connected to the second camera module, then the loads that arise as a result of the electrical contacting preferably do not have any negative effect on the alignment and fastening between the first and the second camera modules.

The objective device may have at least one lens, and preferably multiple lenses.

The heating element may induce heating of the objective device. The heating element is able to be directly coupled with a lens of the objective device. The heating element may induce heating of the lens. The thermal energy supplied by the heating element benefits at least the lens of the objective device that is outermost in the direction of the environment. The contact region may be specified on the first camera module. The contact region may be positioned on a lens housing. The contact region can be situated on the outside surface of a cylindrical lens housing. The contact region may be disposed at a distance from the heating element that supplies the main share of the thermal energy. The connection element and the actuating element are able to be realized as separate components in each case. It is also possible that the actuating element is movable relative to the connection element. Also possible is that the connection element and the actuating element are implemented as a single part. In at least one actuation position, the connection element and the actuating element are able to be directly mechanically coupled with each other. During an at least regional movement of the actuating element for changing the actuation position, a sliding movement can be executed relative to the connection element. The actuating element is able to reach through the connection element.

In accordance with an example embodiment of the present invention, the connection element may be fixed in place on the housing or the circuit board in a form-locked, force-locked and/or integral fashion. The connection element is able to transmit the electrical energy for the supply of the heating element between the circuit board and the contact region. The connection element may be provided with a coupling region for the mechanical coupling with the actuating element. The actuating element may rest against the connection element inside the coupling region. In a translatory actuation movement of the actuating element, a contact force perpendicular thereto is able to act on the connection element via the coupling. The connection element may be produced from a metal.

At least in the second deflection position, the connection element is able to rest against the contact region with preloading. The connection element can be reset to the first deflection position via the actuating element by the application of a counterforce.

In the second actuation position, the actuating element is able to exert a contact pressure on the connection element. The actuating element may be made of plastic, metal and/or a composite material. In relation to the axial direction, the first actuation position may correspond to a position of the actuating element in which it is inserted farther into the camera device than in the second actuation position or is pulled farther out of the camera device. In the second actuation position, the actuating element may be shifted farther in the direction of the objective device in relation to the axial direction than in the first actuation position. After the camera device has been constructed and the electrical connection of the heating element has been established, the actuating element may remain in the camera device or be removed from it.

The actuation movement of the actuating element for changing the actuation position may be a rotary movement and/or a translatory movement. The deflection movement of the connection element for changing the deflection position is able to take place in a direction that deviates from the actuation movement. The deflection movement can be a rotary movement and/or a translatory movement.

Advantageous embodiments of the present invention are described herein.

In one preferred embodiment of the present invention, it is advantageous if the connection element rests against the contact region in a force-applying and electrically conductive manner in the second deflection position. This makes it possible to reliably establish the electrical connection between the connection element and the contact region.

In a preferred embodiment of the present invention, it is provided that the connection element is set apart from the first camera module in the first deflection position. This makes it possible to align the second camera module in relation to the connection element in a force-free manner relative to the first camera module and to fasten it thereto. When the first camera module is connected to the second camera module, the loads that arise between the first and the second camera module by the electrical contacting are able to be reduced.

In the first deflection position, the connection element may be without contact with the contact region. The connection element may rest against the contact region by a first contact pressure in the first deflection position. In the second deflection position, the connection element may rest against the contact region by a second contact pressure. The second contact pressure is preferably greater than the first contact pressure.

In one advantageous embodiment of the present invention, it is provided that the actuation of the actuating element takes place on a side facing away from the first camera module along the axial direction. This allows for an uncomplicated operation of the actuating element even after the first camera module has been attached to the second camera module. The actuation of the actuating element may be performed on the rear side of the camera device. In a preferred embodiment of the present invention, it is provided that the actuating element is coupled with an attachment element and is moved to the second actuation position by the installation of the attachment element. This allows the electrical contacting and the installation of the attachment element to be carried out in a single step. The attachment element may be realized as a housing cover and/or a circuit board. The attachment element may delimit the housing on at least one side. The actuating element and the attachment element are able to be realized separately of each other or as one part. The actuating element and the attachment element may be firmly connected to each other. By fastening the attachment element to the camera device, the actuating element is able to be moved to the second actuation position. If the attachment element is fixed in position and if the actuating element has assumed the second actuation position, then this actuation position is able to be secured via the fixed attachment element.

According to the present invention, a camera device having all the features is provided in addition. This makes it possible to realize the camera device in a more economical, accurate and reliable manner.

The features mentioned in the following text are applicable both to the provided camera device and the provided method for assembling a camera device.

In one special embodiment of the present invention, it is advantageous if the connection element is free of contact with regard to the contact region in a first deflection position which corresponds to a first actuation position, and the predefined deflection position is a second deflection position which corresponds to a second actuation position. This makes it possible to carry out the alignment and the fastening between the first and the second camera module more independently of the electrical contacting between the connection element and the contact region.

In one advantageous embodiment of the present invention, it is provided that the actuating element is fixed in place in the second actuation position. This makes it possible to reliably maintain the electrical contact between the connection element and the contact region. The actuating element is effectively able to prevent a deflection movement of the connection element from the second deflection position to the first deflection position.

In one preferred embodiment of the present invention, it is advantageous if the actuating element is fixed in position in the second actuation position via an attachment element. This allows for a reduction of the required components of the camera device. The actuating element may be directly connected to the attachment element. The attachment element may be connected, preferably in a sealing manner, to a housing of the second camera module. The attachment element can close off the housing on at least one side. The attachment element may be embodied as a housing cover connected to the housing and/or as a circuit board.

In one preferred embodiment of the present invention, it is provided that the connection element is realized as a contact spring. The connection element may be embodied as a flat spring, leaf spring, shaped spring, coil spring or as a bent wire part. This makes it possible to transform the spring force supplied by the connection element into reliable electrical contacting with the contact region. The connection element may be made of steel, spring steel, high-grade steel and/or non-iron metal.

Additional advantages and advantageous embodiments of the present invention result from the description of the figures and the figures.

BRIEF DESCRIPTION OF THE DRAWINGS

In the following text, the present invention will be described in detail with reference to the figures.

DETAILED DESCRIPTION OF EXAMPLE EMBODIMENTS

Figure 1A:
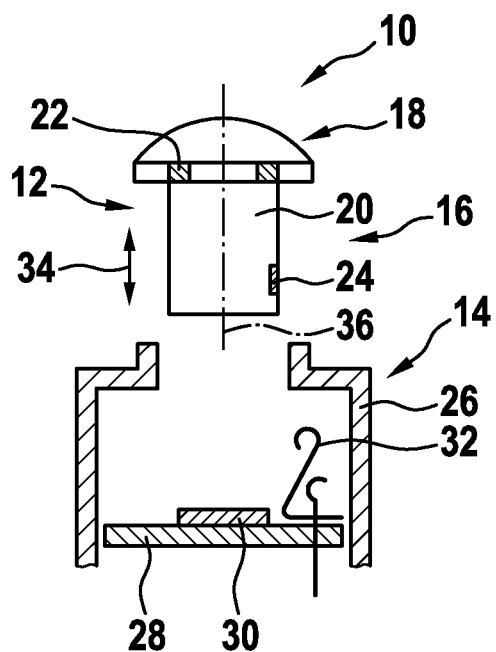
FIG. 1A-1D show individual method steps of a method for assembling a camera device in a special example embodiment of the present invention.

FIGS. 1A-1D show individual method steps of a method 100 for assembling a camera device 10 in a special embodiment of the present invention. Camera device 10 has a first camera module 12 and a second camera module 14, which are connected to each other. An objective device 16, which has at least one lens 18 which is accommodated in a lens housing 20, is allocated to first camera module 12. In addition, an electrical heating element 22 and an electrically conductive contact region 24 connected thereto are allocated to first camera module 12.

Second camera module 14 has a housing 26 in which a circuit board 28 is situated which accommodates an image sensor 30. In addition, second camera module 14 preferably includes an electrical energy supply for heating element 22 and a deflectable connection element 32 for the electrical contacting of heating element 22 via contact region 24.

First and second camera modules 12, 14 are mutually aligned during the assembly in order to allow for the most accurate acquisition of the information transmitted via objective device 16 to image sensor 30. Possible deviations in first camera module 12 and second camera module 14 are able to be taken into account and compensated in the alignment. The further fastening between first and second camera modules 12, 14 is preferably realized while maintaining the adjusted alignment between first and second camera modules 12, 14.

In one special embodiment of the present invention, method 100 for assembling camera device 10 encompasses at least the method steps described in greater detail in the following text. As illustrated in FIG. 1A, first camera module 12 and second camera module 14 are moved toward each other along an axial direction 34 which runs in parallel with an optical axis 36 of objective device 16.

Figure 1B:
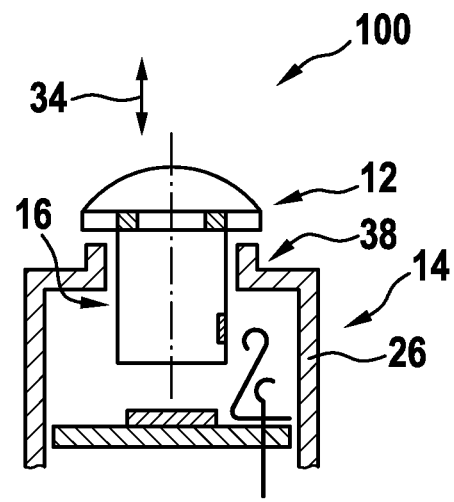

As illustrated in FIG. 1B, this accommodates first camera module 12 in second camera module 14. Housing 26 of second camera module 14 has a receiving section 38 for this purpose, into which objective device 16 is inserted. First camera module 12 is displaceable relative to second camera module 14 so that an alignment between first and second camera modules 12, 14 is able to be performed. The alignment may be a compensation relative to axial direction 34 and/or relative to directions perpendicular thereto. It is also possible in the alignment to perform tilting movements of first camera module 12 with respect to second camera module 14.

Figure 1C:
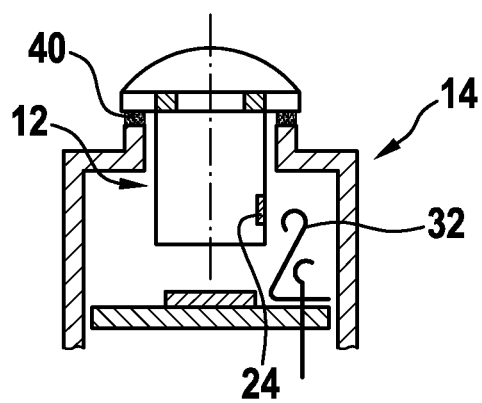

After first camera module 12 has been aligned relative to second camera module 14, it is firmly connected to second camera module 14 via a bonded connection 40, as illustrated in FIG. 1C. While first camera module 12 is aligned relative to second camera module 14 and fixed in position via bonded connection 40, deflectable connection element 32 is in a first deflection position in which it is set apart from first camera module 12 and free of contact with regard to contact region 24. A force acting on first camera module 12 via connection element 32 may therefore be absent during the alignment and fastening between the first and second camera module 12, 14, and first camera module 12 is able to be accurately and reliably connected to second camera module 14.

Figure 1D:
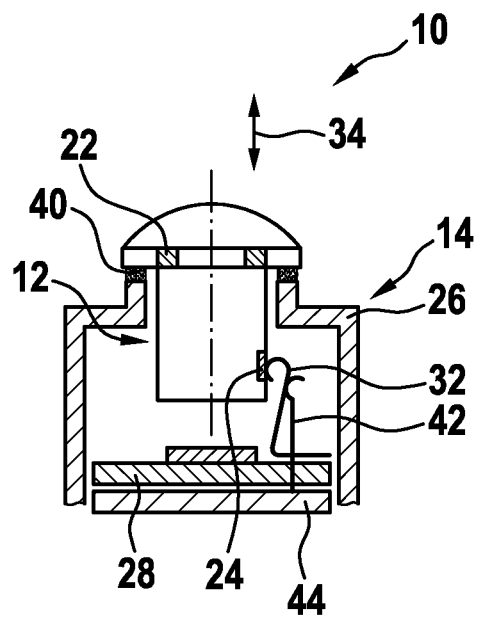

After the bonded connection 40 between first and second camera modules 12, 14 has cured, contact region 24 is electrically connected to circuit board 28 via connection element 32, with reference to FIG. 1D. For this purpose, an actuating element 42, inserted through circuit board 28 and connection element 32, is actuated on a side facing away from first camera module 12 in relation to axial direction 34, the actuation taking place from a first actuation position as shown in FIGS. 1A to 1C, for example, to a second actuation position offset thereto in relation to axial direction 34, as illustrated in FIG. 1D. This mechanically couples actuating element 42 with obliquely extending connection element 32 and induces a contact pressure thereon that moves connection element 32 to the second deflection position, which in turn presses connection element 32 against contact region 24 in a force-applying manner using a contact pressure. In this way, heating element 22 of first camera module 12 is able to be electrically contacted with circuit board 28 in a reliable manner.

Actuating element 42 is preferably connected to attachment element 44, which closes off housing 26 on at least one side. Due to the coupling between attachment element 44 and actuating element 42, actuating element 42 is moved to the second actuation position when attachment element 44 is placed on top. In this way, the design of camera device 10 can be simplified further. The movement of actuating element 42 and the positioning of attachment element 44 may take place in a single method step. This, too, ensures that actuating element 42 is actually moved to the second actuation position and connection element 32 is thereby moved to the second deflection position for the electrical contacting of contact region 24.

Figure 2:
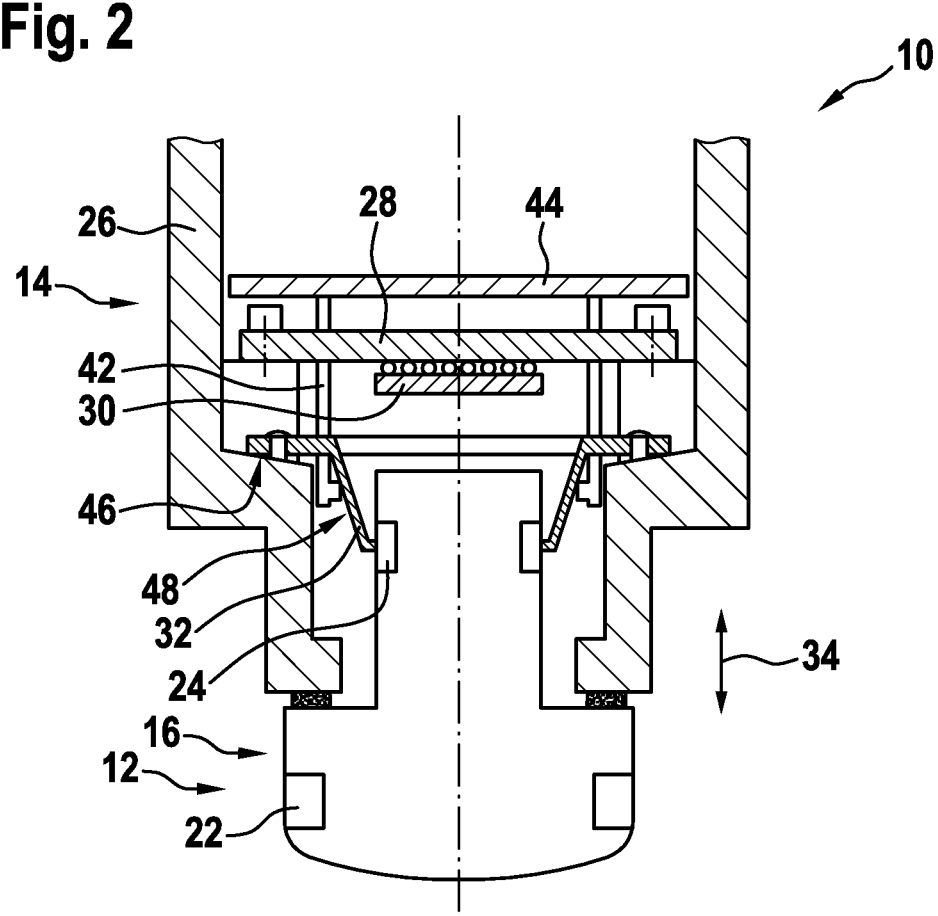
FIG. 2 shows a cross-section of a camera device in a special example embodiment of the present invention.

FIG. 2 shows a cross-section of a camera device 10 in a special embodiment of the present invention. Camera device 10 includes a first camera module 12, which has objective device 16, heating element 22 and electrically conductive contact region 24. In addition, camera device 10 has a second camera module 14, which includes housing 26, circuit board 28 provided with image sensor 30, and connection element 32 for the electrical contacting of contact region 24. Connection element 32 has a fastening region 46, which is firmly connected to housing 26. As an alternative or in addition, connection element 32 can also be fixed in position on circuit board 28. Circuit board 28 in turn is firmly connected to housing 26.

When attachment element 44 is installed, actuating element 42 coupled with attachment element 44 is in the second actuation position in which it triggers the second deflection position in connection element 32 and thereby presses connection element 32 against contact region 24 under the application of force for the electrical connection of heating element 22. This makes it possible to supply electrical energy to heating element 22 in first camera module 12 via connection element 32. The energy supply may be assigned to circuit board 28.

Connection element 32 is mechanically coupled with actuating element 42 in a coupling region 48. Through this coupling, a movement of actuating element 42 along axial direction 34 leads to a deflection position of connection element 32. As a result, a deflection position of connection element 32 is able to be changed and contacting between connection element 32 and contact region 24 thus be influenced via the movement of actuating element 42 and the coupling.

Figure 3:
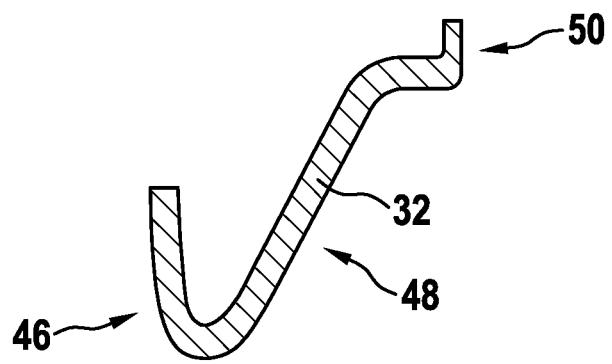
FIG. 3 shows a cross-section of a connection element in a special example embodiment of the present invention.

FIG. 3 shows a cross-section of a connection element 32 in a special embodiment of the present invention. Connection element 32 is preferably embodied as a contact spring, which has a fastening region 46 for the connection to a housing or a circuit board. A coupling region 48 for the mechanical coupling with the actuating element adjoins fastening region 46. Situated next to coupling region 48 in turn is a connection region 50 for the electrical contacting with the contact region.

Figure 4:
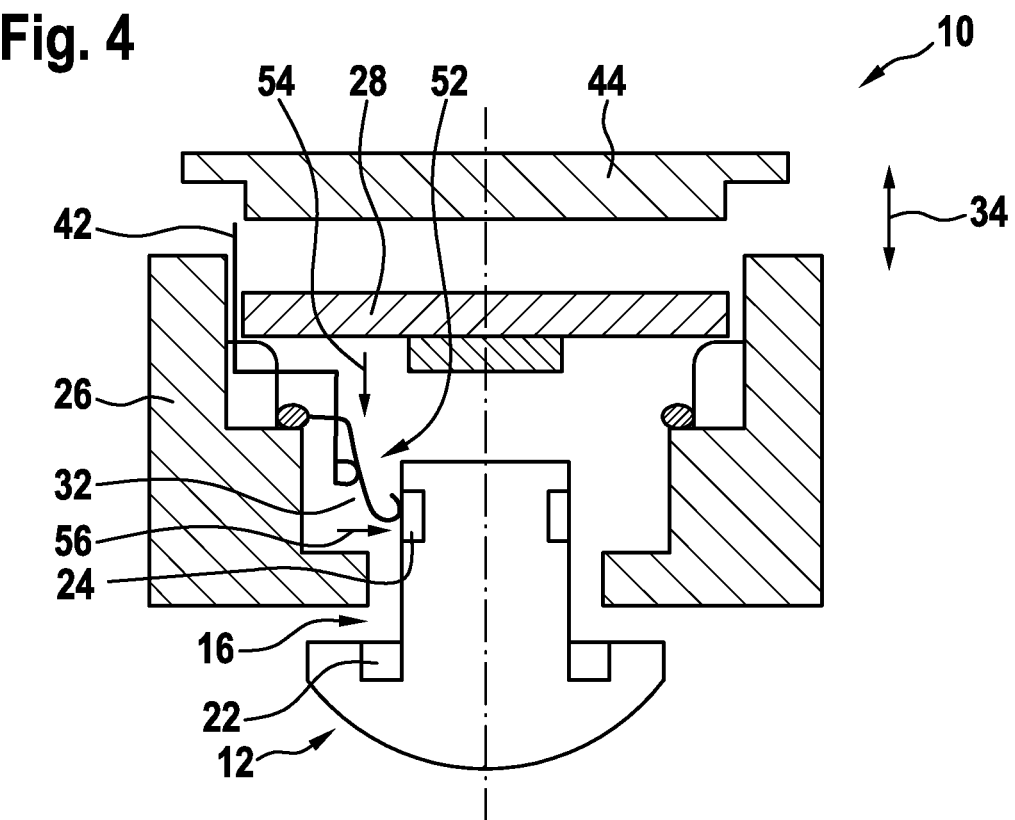
FIGS. 4 and 5 each show a respective cross-section of a camera device in a further special example embodiment of the present invention.

FIG. 4 shows a cross-section of a camera device 10 in a further special embodiment of the present invention. The design is similar to the design of FIG. 2. The essential differences in this regard will be described in the following text. Actuating element 42 is externally guided past circuit board 28 and situated between attachment element 44 and first camera module 12. A movement of attachment element 44 in axial direction 34 toward objective device 16 moves actuating element 42 along axial direction 34 to a second actuation position, via which connection element 32 connected to housing 26 is moved to the second deflection position for the electrical contacting with first camera module 12. To this end, actuating element 42 has a contact region 52 for the mechanical coupling with connection element 32. An actuation movement 54 of actuating element 42 along axial direction 34 thus leads to a deflection movement 56 of connection element 32, which is positioned against contact region 24.

Figure 5:
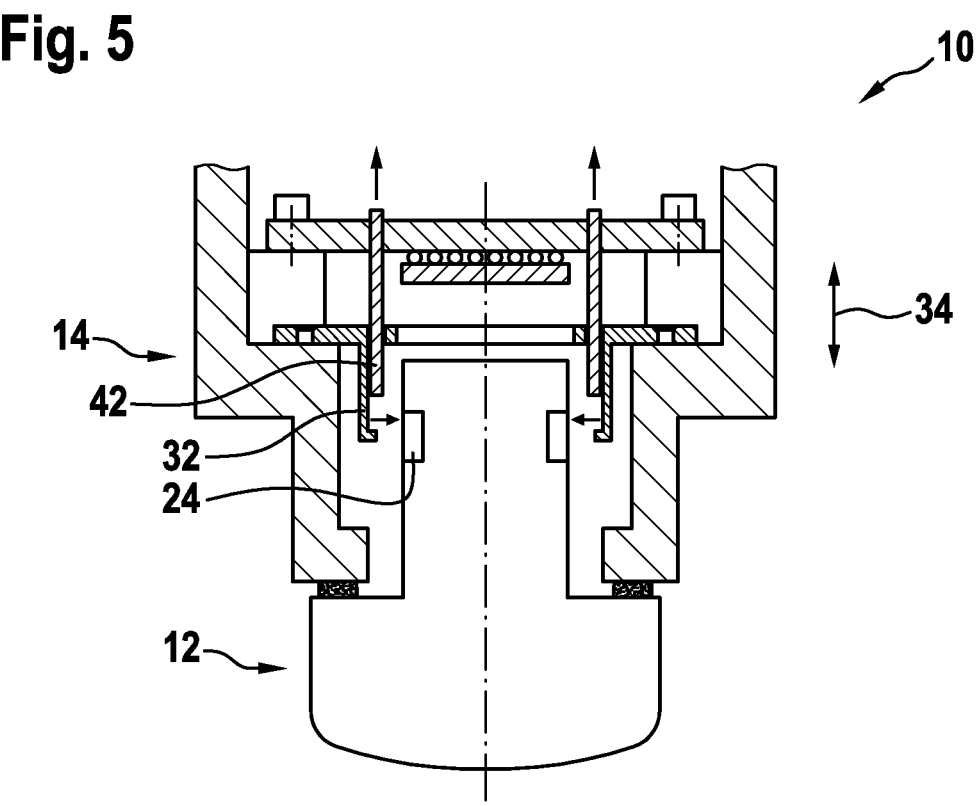

After attachment element 44 is firmly connected to housing 26, actuating element 42 is fixed in position in the second actuation position via attachment element 44, so that reliable electrical contacting of heating element 22 is established by way of connection element 32. Attachment element 44 may close off the camera device on the rear side. FIG. 5 shows a cross-section of a camera device 10 in a further special embodiment of the present invention. The design is similar to the design of FIG. 2 with the exception of the following differences. Connection element 32 is embodied as a contact spring, which—if no counterforce is applied—rests against contact region while applying force. To enable connection element 32 to assume the first deflection position, actuating element 42 is inserted in the illustrated manner, coupled with connection element 32 and exerts a counterforce on connection element 32. If connection element 32 is to be contacted with contact region 24 in a force-applying manner after the alignment and fastening between first and second camera group 12, 14 has been accomplished, then actuating element 42 is moved from the illustrated first actuation position to a second actuation position offset along axial direction 34, so that the counterforce on connection element 32 is absent and connection element 32 rests against contact region 24 via its own preloading force which is applied in the form of a contact spring. Actuating element 42 may subsequently be completely removed from camera device 10.

What is claimed is:

1. A method for assembling a camera device including a first camera module including at least one objective device having an optical axis, an electrical heating element, and an electrically conductive contact region, a second camera module which is connectable to the first camera module and has an electrical energy supply for the heating element, and a deflectable connection element for electrical contacting of the heating element via the contact region, wherein the contacting is dependent upon an actuation position of an actuating element, which is able to be mechanically coupled with the connection element, the method comprising:
   establishing a connection between the first camera module and the second camera module including:
      mutually fixing in position the first camera module and the second camera modules while the connection element is in a first deflection position, and
      starting from a first actuation position, subsequently moving the actuating element from the first actuation position to a second actuation position, offset from the first actuation position, along an axial direction that runs in parallel with the optical axis, and in the process of the moving of the actuating element, moving the connection element to a second deflection position.

2. The method as recited in claim 1, wherein the connection element rests against the contact region in a force-applying and electrically conductive manner in the second deflection position.

3. The method as recited in claim 1, wherein the connection element is set apart from the first camera module in the first deflection position.

4. The method as recited in claim 1, wherein the actuation of the actuating element takes place on a side facing away from the first camera module along the axial direction.

5. The method as recited in claim 1, wherein the actuating element is coupled with an attachment element and moved to the second actuation position by installation of the attachment element.

6. A camera device, comprising:
   a first camera module including at least one objective device having an optical axis, an electrical heating element, and an electrically conductive contact region;
   a second camera module which is connectable to the first camera module and has an electrical energy supply for the heating element, and a deflectable connection element;
   wherein depending on a deflection position, the connection element rests against the contact region for the electrical contacting of the heating element and is able to be mechanically coupled with an actuating element, which is movable at least along an axial direction extending in parallel with the optical axis, and the deflection position is a function of an actuation position of the actuating element with regard to the axial direction, and the connection element rests against the contact region in a force-applying and electrically conductive manner in a predefined deflection position.

7. The camera device as recited in claim 6, wherein in a first deflection position, which corresponds to a first actuation position, the connection element is free of contact with regard to the contact region and the predefined deflection position is a second deflection position, which corresponds to a second actuation position.

8. The camera device as recited in claim 7, wherein the actuating element is fixed in position in the second actuation position via an attachment element.

9. The camera device as recited in claim 8, wherein the attachment element is connected to a housing of the second camera module.

10. The camera device as recited in claim 6, wherein the connection element is a contact spring.

* * * * *